United States Patent
Nawa et al.

(10) Patent No.: US 11,447,098 B2
(45) Date of Patent: Sep. 20, 2022

(54) AUTHENTICATION SYSTEM, MOBILE DEVICE, PROCESSING DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventors: Yuuki Nawa, Aichi (JP); Daisuke Kawamura, Aichi (JP); Minoru Otake, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/208,394

(22) Filed: Mar. 22, 2021

(65) Prior Publication Data
US 2021/0291789 A1  Sep. 23, 2021

(30) Foreign Application Priority Data

Mar. 23, 2020 (JP) .............................. JP2020-051248

(51) Int. Cl.
*B60R 25/24* (2013.01)
*H04W 12/06* (2021.01)
(Continued)

(52) U.S. Cl.
CPC ............ *B60R 25/241* (2013.01); *G06F 21/35* (2013.01); *H04W 4/027* (2013.01); *H04W 12/06* (2013.01); *B60R 2325/205* (2013.01)

(58) Field of Classification Search
CPC ............ G07C 9/00182; G07C 9/00309; G07C 2009/00769; G07C 2209/63; H04W 12/06;
(Continued)

(56) References Cited

U.S. PATENT DOCUMENTS

2013/0326592 A1* 12/2013 Yamada .................. H04L 63/08
726/4
2018/0083783 A1* 3/2018 Mergen ............... H04L 63/0861
(Continued)

FOREIGN PATENT DOCUMENTS

JP      2016-211334 A    12/2016

*Primary Examiner* — Orlando Bousono
(74) *Attorney, Agent, or Firm* — Greenblum & Bernstein, P.L.C.

(57) ABSTRACT

A mobile device is carried by a person to be authenticated. An acceleration sensor is installed in the mobile device and configured to output an acceleration signal corresponding to acceleration applied to the mobile device. A processing device is configured to execute determination processing for determining whether the person is walking based on the acceleration signal. A control device is configured to control operation of a controlled device based on a result of the determination processing and a result of processing for authenticating, by way of the mobile device, the person as a user of the controlled device. The control of the controlled device based on the authentication processing is disabled from time when the determination processing is initiated by the processing device until when a determination as to whether the person is walking is initially made.

6 Claims, 6 Drawing Sheets

(51) Int. Cl.
*G06F 21/35* (2013.01)
*H04W 4/02* (2018.01)

(58) Field of Classification Search
CPC ...... H04W 12/63; H04W 4/027; G08C 17/02; B60R 25/24; B60R 25/241; B60R 2325/205; G06F 21/31; G06F 21/316; G06F 21/32; G06F 21/35
See application file for complete search history.

(56) References Cited

U.S. PATENT DOCUMENTS

2019/0088113 A1* 3/2019 Tanabe .................. G08B 21/02
2020/0053653 A1* 2/2020 Okuda .................. G06F 1/1694
2020/0167456 A1* 5/2020 Sato ......................... G06T 1/00

* cited by examiner

AUTHENTICATION SYSTEM, MOBILE DEVICE, PROCESSING DEVICE, AND NON-TRANSITORY COMPUTER-READABLE MEDIUM

FIELD

The presently disclosed subject matter relates to an authentication system. The presently disclosed subject matter also relates to a mobile device and a processing device that may be included in the authentication system. The presently disclosed subject matter also relates to a non-transitory computer-readable medium having recorded a computer program adapted to be executed by a processor of the processing device.

BACKGROUND

Japanese Patent Publication No. 2016-211334A discloses an authentication system adapted to be installed in a vehicle. In the system, authentication is performed between a control device for controlling the operation of a locking device, which is an example of a controlled device, and a key, which is an example of a mobile device owned by a person to be authenticated, through communication with a radio wave. When the authentication is approved, the door of the vehicle is unlocked.

SUMMARY

Technical Problem

It is demanded to improve the convenience of such an authentication system.

Solution to Problem

In order to meet the demand described above, one illustrative aspect of the presently disclosed subject matter provides an authentication system, comprising:

a mobile device adapted to be carried by a person to be authenticated;

an acceleration sensor installed in the mobile device and configured to output an acceleration signal corresponding to acceleration applied to the mobile device;

a processing device configured to execute determination processing for determining whether the person is walking based on the acceleration signal; and a control device configured to control an operation of a controlled device based on a result of the determination processing and a result of authentication processing for authenticating, by way of the mobile device, the person as a user of the controlled device, wherein the control of the controlled device based on the authentication processing is disabled from time when the determination processing is initiated by the processing device until when a determination as to whether the person is walking is initially made.

In order to meet the demand described above, one illustrative aspect of the presently disclosed subject matter provides a mobile device adapted to be carried by a person to be authenticated, comprising:

an acceleration sensor configured to output an acceleration signal corresponding to acceleration applied to the mobile device; and a processor configured to disable a control device to control an operation of a controlled device based on authentication processing for authenticating the person as a user of the controlled device from time when determination processing for determining whether the person is walking based on the acceleration signal is initiated until when a determination as to whether the person is walking is initially made.

In order to meet the demand described above, one illustrative aspect of the presently disclosed subject matter provides a processing device, comprising:

a reception interface configured to accept an acceleration signal corresponding to acceleration applied to a mobile device adapted to be carried by a person to be authenticated from an acceleration sensor installed in the mobile device; and a processor configured to disable a control device to control an operation of a controlled device based on authentication processing for authenticating, by way of the mobile device, the person as a user of the controlled device from time when determination processing for determining whether the person is walking based on the acceleration signal is initiated until when a determination as to whether the person is walking is initially made.

In order to meet the demand described above, one illustrative aspect of the presently disclosed subject matter provides a non-transitory computer-readable medium having stored a computer program adapted to be executed by a processor of a processing device and configured to, when executed, cause the processing device to:

accept an acceleration signal corresponding to acceleration applied to a mobile device adapted to be carried by a person to be authenticated from an acceleration sensor installed in the mobile device;

execute determination processing for determining whether the person is walking based on the acceleration signal; and disable a control device to control an operation of a controlled device based on authentication processing for authenticating, by way of the mobile device, the person as a user of the controlled device from time when the determination processing is initiated until when a determination as to whether the person is walking is initially made.

According to the configuration according to each of the above illustrative aspects, the result of the determination processing for determining whether a person to be authenticated is walking can be used for the authentication processing for authenticating the person as a user of the controlled device. Further, the control of the operation of the controlled device by the control device based on the authentication processing is forcibly disabled from the time when the walking determination processing is initiated by the processing device until the time when the determination as to whether the person is walking is initially made. As a result, it is possible to further reduce the possibility that the operation control of the controlled device is made by an illegal act such as a relay attack that could be performed until the initial walking determination processing is completed. Accordingly, it is possible to improve the convenience of the authentication system.

DESCRIPTION OF EMBODIMENTS

Figure 1:
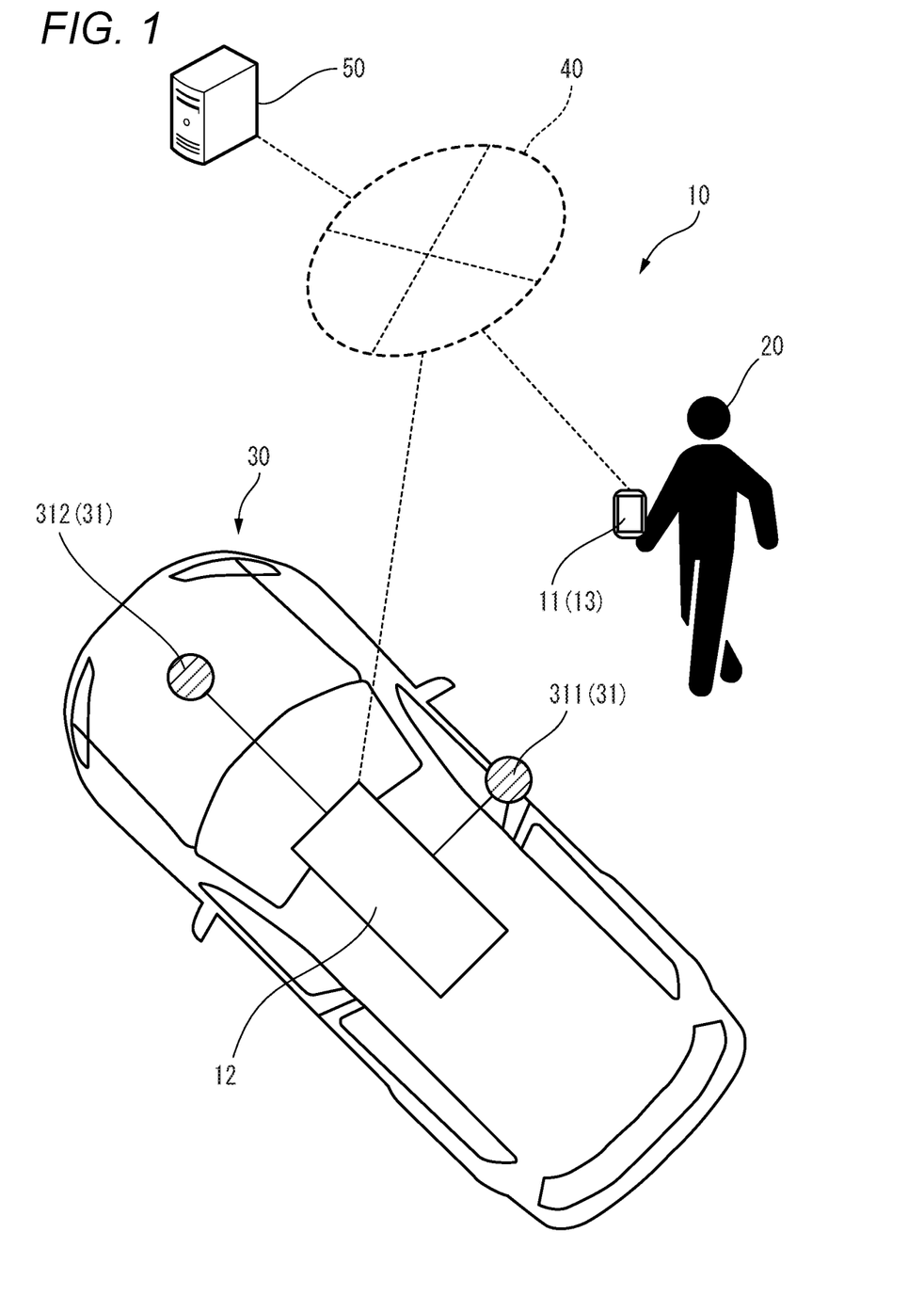
FIG. 1 illustrates a configuration of an authentication system according to an embodiment.

Examples of embodiments will be described in detail below with reference to the accompanying drawings. FIG. 1 illustrates a configuration of an authentication system 10 according to an embodiment. The authentication system 10 may be used, for example, to authenticate a person 20 to be authenticated (hereinafter, referred to as an authenticated person 20, or a person 20) as a user of a vehicle 30 thereby allowing the authenticated person 20 to use the vehicle 30.

The authentication system 10 includes a mobile device 11. The mobile device 11 is a device capable of being carried by the authenticated person 20.

The authentication system 10 includes a control device 12. In this example, the control device 12 is installed in the vehicle 30. The control device 12 is configured to control the operation of a controlled device 31 installed in the vehicle 30 based on an authentication processing for authenticating the person 20 as a user of the vehicle 30 via the mobile device 11. In FIG. 1, a locking device 311 and an engine 312 are illustrated as controlled devices 31. The controlled devices 31 may also include an air conditioner, an audio-visual equipment, a lighting device, a position adjustment mechanism for a seat or a steering wheel, and the like.

As used herein, the term "authentication process" means a process including a process of authenticating the person 20 itself as a user, and a process of authenticating the mobile device 11 itself owned by the authenticated person 20 as a user.

The authentication system 10 includes a processing device 13. The processing device 13 is configured to execute an authentication process in cooperation with the control device 12. In this example, the processing device 13 is installed in the mobile device 11.

The authentication processing will be described in detail with reference to FIG. 2. The control device 12 includes a processor 121. The processor 121 is configured to control wireless transmission of a trigger signal TS from a transmitter 32 installed in the vehicle 30. The trigger signal TS is transmitted at prescribed time intervals. The prescribed time interval is, for example, several hundred milliseconds. The trigger signal TS may be an analog signal or a digital signal. It should be noted that the trigger signal TS may be constantly transmitted from the transmitter 32 regardless of the operation of the control device 12.

The processing device 13 includes a reception interface 131 and a processor 132. The reception interface 131 is configured as an interface capable of accepting the trigger signal TS through a receiver 111 installed in the mobile device 11. When the trigger signal TS is an analog signal, the reception interface 131 may be equipped with an appropriate conversion circuit including an A/D converter. The trigger signal TS in the form of digital data is subjected to processing performed by the processor 132.

The processor 132 is configured to wirelessly transmit an authentication information AI through the transmitter 112 installed in the mobile device 11 in response to the trigger signal TS. The authentication information AI is information capable of identifying at least one of the authenticated person 20 and the mobile device 11.

That is, when the authenticated person 20 carrying the mobile device 11 approaches the vehicle 30 to a distance capable of receiving the trigger signal TS, the authentication information AI is transmitted from the mobile device 11. The authentication information AI may be in the form of analog data or digital data.

The control device 12 includes a reception interface 122. The reception interface 122 is configured as an interface capable of accepting the authentication information AI through a receiver 33 installed in the vehicle 30. In a case where the authentication information AI is in the form of analog data, the reception interface 122 may be equipped with an appropriate conversion circuit including an A/D converter. The authentication information AI in the form of digital data is subjected to processing performed by the processor 121.

The processor 121 of the control device 12 is configured to be capable of executing a processing for reading or referencing the authentication information AI stored in a storage device 34 installed in the vehicle 30. The processor 121 matches the authentication information AI accepted by the reception interface 122 with the authentication information AI stored in the storage device 34, and approves authentication when both match.

The control device 12 includes an output interface 123. The processor 121 allows the output of a control signal CS from the output interface 123. The control signal CS is a signal for controlling the operation of the controlled device 31. The control signal CS may be a digital signal or an analog signal. In a case where the control signal CS is an analog signal, the output interface 123 may be equipped with an appropriate conversion circuit including a D/A converter.

For example, the control signal CS may be a signal for causing the locking device 311 to unlock the door of the vehicle 30. Alternatively, the control signal CS may be a signal for activating the engine 312. That is, when the person 20 is authenticated as a user of the vehicle 30 through the wireless communication performed between the mobile device 11 and the control device 12, the door of the vehicle 30 is unlocked and the engine 312 is activated.

Figure 3:
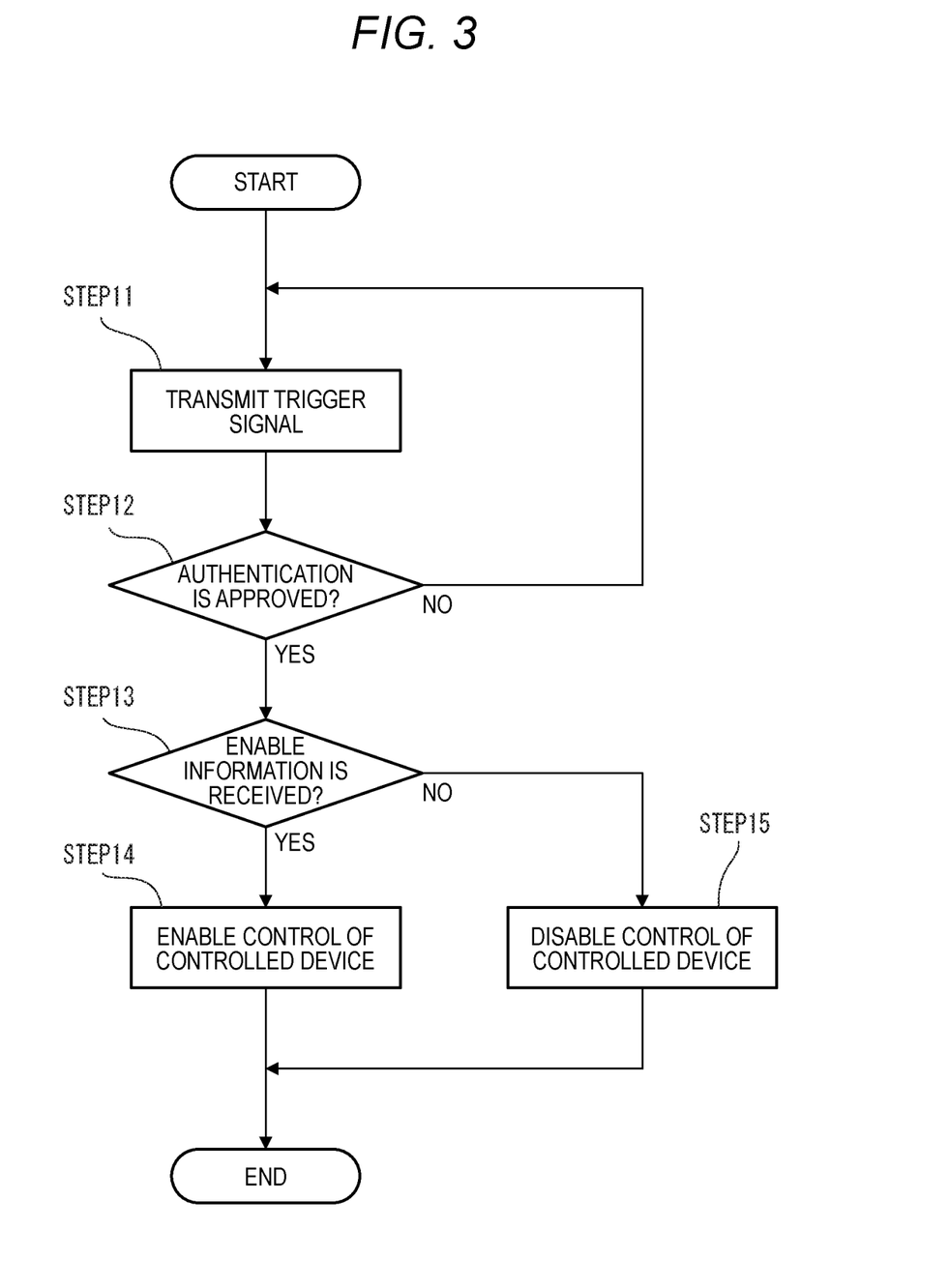
FIG. 3 illustrates a flow of processing executed in a control device of the authentication system.

FIG. 3 illustrates a flow of processing executed by the control device 12. As described above, the control device 12 wirelessly transmits the trigger signal TS at prescribed time intervals through the transmitter 32 installed in the vehicle 30 (STEP11).

Figure 4:
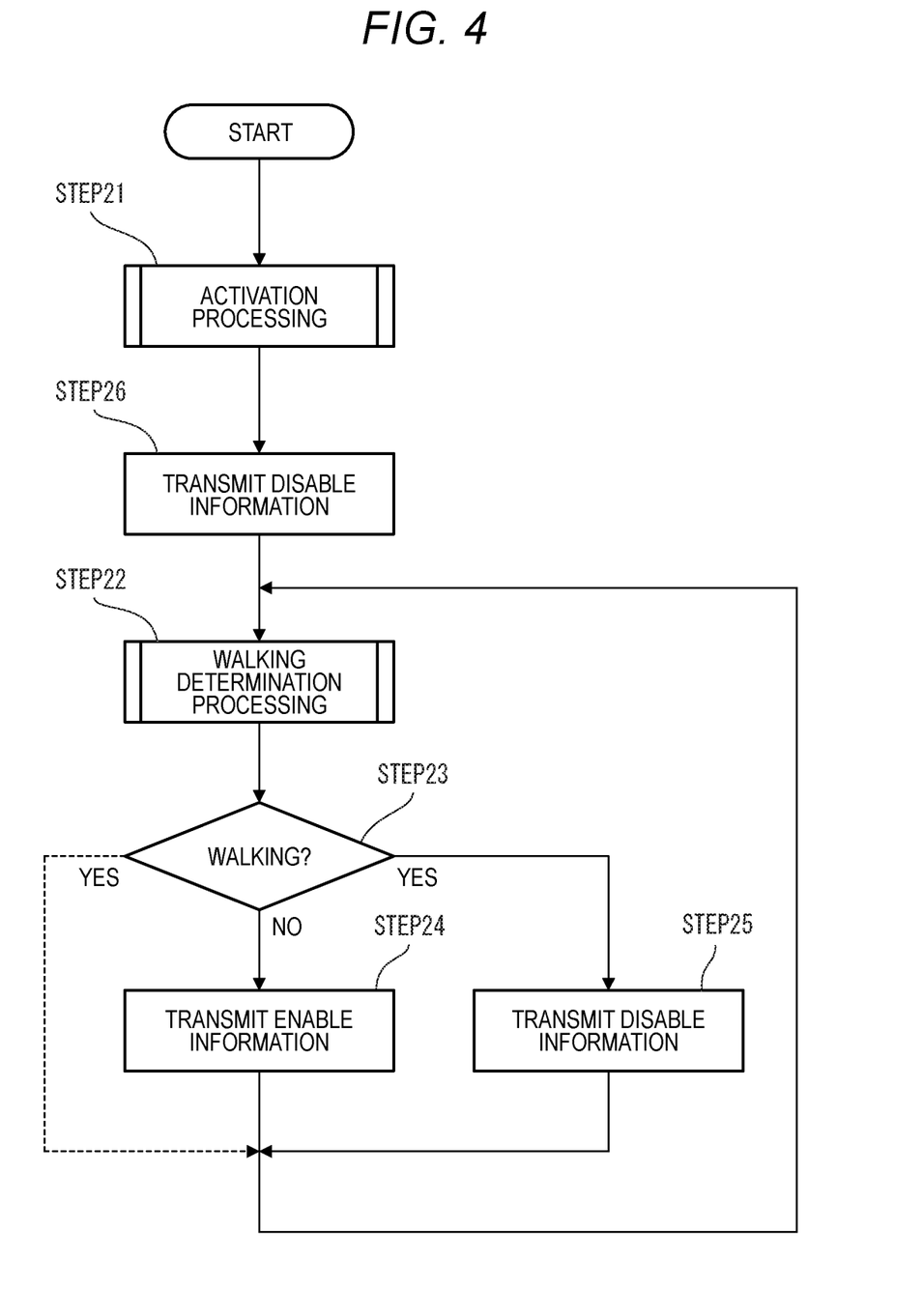
FIG. 4 illustrates a flow of processing executed in a mobile device of the authentication system.

FIG. 4 illustrates a flow of processing executed by the mobile device 11. When the authenticated person 20 carrying the mobile device 11 approaches the vehicle 30, the trigger signal TS wirelessly transmitted from the control device 12 installed in the vehicle 30 is wirelessly received by the mobile device 11. As a result, an activation processing is executed (STEP21). In the activation processing, the above-described authentication information AI is wirelessly transmitted.

As illustrated in FIG. 3, in the control device 12, it is determined whether the authentication for the person 20 is approved based on the authentication information AI wirelessly transmitted from the mobile device 11 (STEP12). When the wireless reception of the authentication information AI through the receiver 33 installed in the vehicle 30 is not performed, or when the wirelessly received authentication information AI does not match the authentication information stored in the storage device 34 (NO in STEP12), the processing returns to STEP11.

As illustrated in FIG. 4, in the mobile device 11, a walking determination processing for determining whether the authenticated person 20 is walking is executed (STEP22). Details of the walking determination processing will be described later.

When it is determined that the authenticated person 20 is not walking as a result of the walking determination processing (NO in STEP23), the processor 132 of the processing device 13 wirelessly transmits the enablement information EI through the transmitter 112 of the mobile device 11 (STEP24). The enablement information EI may be in the form of analog data or may be in the form of digital data.

When it is determined that the authenticated person 20 is walking as a result of the walking determination processing (YES in STEP23), the processor 132 of the processing device 13 wirelessly transmits the disablement information DI through the transmitter 112 of the mobile device 11 (STEP25). The disablement information DI may be in the form of analog data or may be in the form of digital data.

After the transmission of the enablement information EI or the disablement information DI, the processing returns to STEP22, and the walking determination processing is repeated. As illustrated by dashed lines in FIG. 4, the processor 132 may disable the transmission of the enablement information EI instead of the transmission of the disablement information DI.

Figure 2:
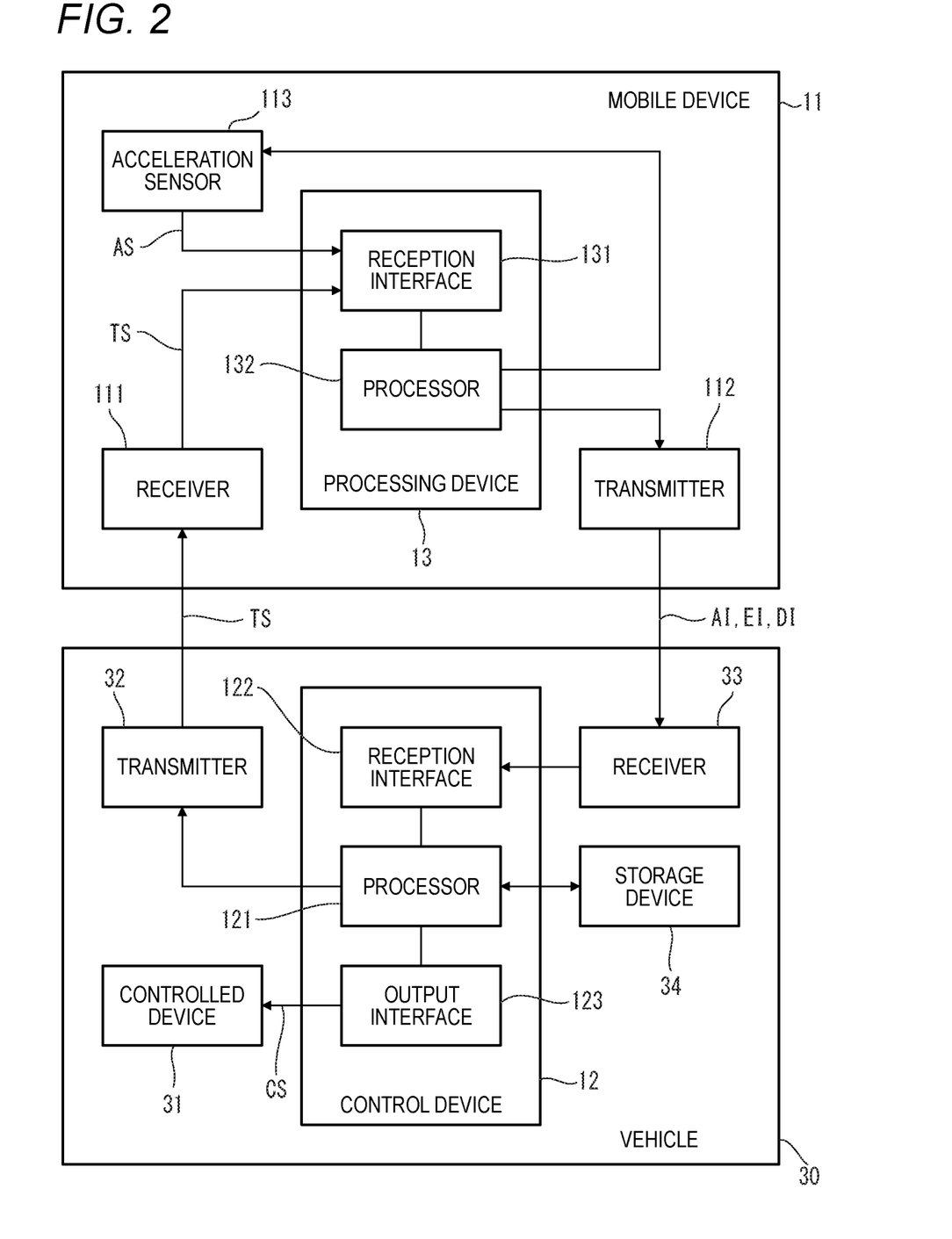
FIG. 2 illustrates a detailed functional configuration of the authentication system.

As illustrated in FIG. 2, the enablement information EI and the disablement information DI wirelessly transmitted from the transmitter 112 of the mobile device 11 are wirelessly received by the receiver 33 of the vehicle 30. The reception interface 122 of the control device 12 is configured as an interface capable of accepting the enablement information EI and the disablement information DI. In a case where each of the enablement information EI and the disablement information DI is in the form of analog data, it may be equipped with an appropriate conversion circuit including an A/D converter. The enablement information EI and the disablement information DI in the form of digital data are subjected to processing performed by the processor 121.

As illustrated in FIG. 3, when the authentication for the person 20 is approved (YES in STEP12), the processor 121 of the control device 12 determines whether the enablement information EI is accepted from the mobile device 11 (STEP13). When the enablement information EI is accepted (YES in STEP13), the processor 121 enables the control of the controlled device 31 (STEP14). That is, a control signal CS for causing the controlled device 31 to perform a prescribed operation in accordance with the approval of the authentication is outputted from the output interface 123.

When the reception interface 122 receives the disablement information DI or when the enablement information EI is not transmitted from the mobile device 11 (NO in STEP13), the processor 121 disables the control of the controlled device 31 (STEP15). That is, the output of the control signal CS is not performed.

According to the configuration as described above, the result of the walking determination processing can be used for the authentication processing performed by the control device 12. For example, even if the authentication of the person 20 is approved, when it is determined that the authenticated person 20 is walking, the control of the operation of the controlled device 31 by the control device 12 can be disabled. The authenticated person 20 normally does not walk when unlocking the door of the vehicle 30 or activating the engine 312 by way of the authentication processing. That is, in a situation that the control device 12 accepts the authentication information AI while the authenticated person 20 is walking, it can be said that there is a high possibility that an illegal act such as a relay attack is performed. According to the configuration of the present embodiment, since the control of the operation of the controlled device 31 is enabled by the control device 12 when it is determined that the authentication is approved and the authenticated person 20 is not walking, it is possible to improve the security against an illegal act such as a relay attack.

The processor 121 having the above-described function can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having recorded a computer program. The general-purpose microprocessor designates at least a part of a computer program stored in the ROM, loads the program on the RAM, and executes the processing described above in cooperation with the RAM. The above-described computer program may be pre-installed in the general-purpose memory, or may be downloaded from an external server device 50 via a wireless communication network 40 illustrated in FIG. 1 and then installed in the general-purpose memory. In this case, the external server device 50 is an example of a non-transitory computer-readable medium having stored a computer program.

The processor 121 having the above-described function may be realized by a dedicated integrated circuit capable of executing the above-described computer program, such as a microcontroller, an ASIC, and an FPGA. In this case, the above-described computer program is pre-installed in a memory element included in the dedicated integrated circuit. The memory element is an example of a non-transitory computer-readable medium having stored a computer program. The processor 121 may be implemented by a combination of the general-purpose microprocessor and the dedicated integrated circuit.

Next, the details of the walking determination processing executed by the processing device 13 in order to realize the operation of the authentication system 10 as described above will be described.

As illustrated in FIG. 2, the mobile device 11 includes an acceleration sensor 113. The acceleration sensor 113 is configured to output an acceleration signal AS corresponding to an acceleration applied to the mobile device 11. The acceleration sensor 113 may be, for example, a well-known three-axis acceleration sensor. In this case, the acceleration signal AS has a value corresponding to the acceleration in each of the three mutually orthogonal axes. The acceleration signal AS may be an analog signal or a digital signal.

The reception interface 131 of the processing device 13 is configured as an interface capable of receiving the acceleration signal AS. In a case where the acceleration signal AS is an analog signal, the reception interface 131 may be equipped with an appropriate conversion circuit including an A/D converter. The acceleration signal AS in the form of digital data is subjected to processing performed by the processor 132 of the processing device 13.

Figure 5:
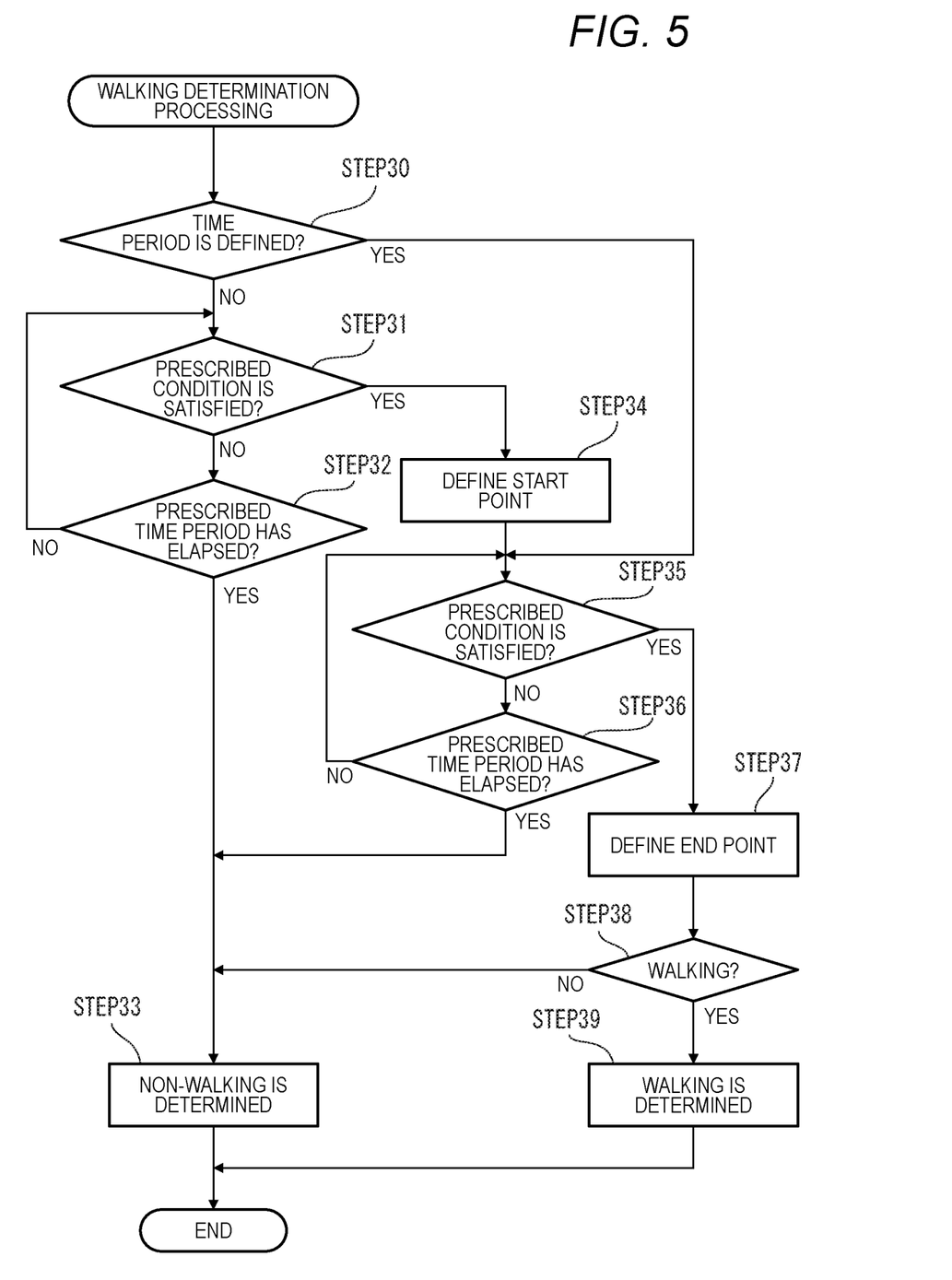
FIG. 5 illustrates a flow of processing in a walking determination processing of FIG. 4.
Figure 6:
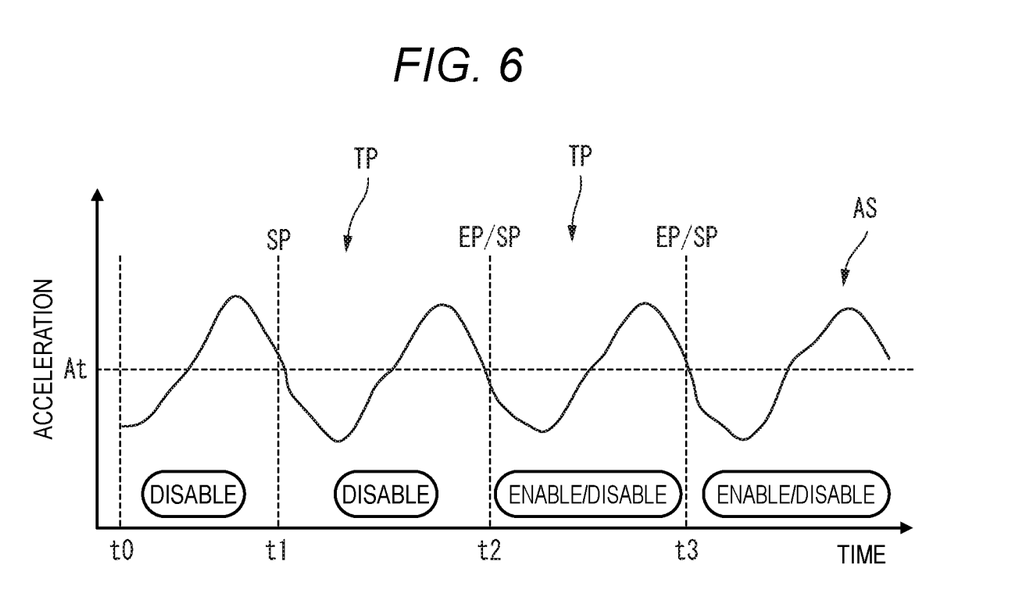
FIG. 6 illustrates details of the walking determination processing.

The processor 132 is configured to execute the walking determination processing for determining whether the authenticated person 20 is walking based on the acceleration signal AS. FIG. 5 illustrates a flow of the walking determination processing. FIG. 6 illustrates the acceleration signal AS. In FIG. 6, the horizontal axis represents the elapse of time, and the vertical axis represents the acceleration. Since the attitude of the mobile device 11 is not constant, the value of the acceleration illustrated corresponds to a norm value given as the square root of the values of the acceleration in the respective three axes. In the following descriptions, "acceleration" means a "norm value" unless otherwise specified.

When the acquisition of the acceleration signal AS is initiated at a time point t0, the processor 132 determines whether a time period TP (described later) is defined (STEP30). Here, since it is immediately after the initiation of the walking determination processing (NO in STEP30), the processor 132 determines whether the acceleration corresponding to the acceleration signal AS satisfies a prescribed condition (STEP31).

In this example, it is determined whether the acceleration changes from a value more than a threshold At to a value less than the threshold At, as well as whether an amount of change in the acceleration per unit time (i.e., a downslope gradient) exceeds a threshold. A relatively large acceleration is applied to the mobile device 11 carried by the walking authenticated person 20, and the amount of change tends to be relatively large. This condition corresponds to this phenomenon.

In FIG. 6, in order to facilitate understanding, the threshold At of the acceleration assumes a constant value. However, the threshold At may be redefined as an average value of the acceleration every time when a prescribed time period elapses. The time is, for example, 500 milliseconds.

When the above condition as for the change in the acceleration is not satisfied (NO in STEP31), the processor 132 determines whether a prescribed time period has elapsed (STEP32). The time period is, for example, 1 second. When it is determined that the prescribed time period has not elapsed (NO in STEP32), the processing returns to STEP31.

When the above-described condition as for the change in the acceleration is not satisfied and the prescribed time period elapses (YES in STEP32), the processor 132 determines that the authenticated person 20 is not walking (STEP33), and terminates the processing. The result of this determination is reflected in the determination in STEP23 of FIG. 4. That is, the mobile device 11 wirelessly transmits the enablement information EI (STEP24). The control device 12 installed in the vehicle 30 accepts the enablement information EI via the receiver 33. Accordingly, the operation of the controlled device 31 can be enabled by the control device 12 (YES in STEP13 and STEP14 of FIG. 3).

When the above-described condition as for the change in the acceleration is satisfied (YES in STEP31), the processor 132 defines a start point of the time period for performing the walking determination processing (STEP34). In the example illustrated in FIG. 6, the above condition as for the acceleration change is satisfied at a time point t1 after the time point t0. Accordingly, the processor 132 defines a start point SP of the time period TP at the time point t1. The start point SP is an example of the first time point.

Subsequently, the processor 132 determines whether the acceleration corresponding to the acceleration signal AS satisfies the condition as for the above-described acceleration change again (STEP35 in FIG. 5). When the condition is not satisfied (NO in STEP35), the processor 132 determines whether a prescribed time period has elapsed (STEP36). The time period is, for example, 1 second. When it is determined that the prescribed time period has not elapsed (NO in STEP36), the processing returns to STEP35.

When the above-described condition as for the change in the acceleration is not satisfied again and the prescribed time period elapses (YES in STEP36), the processor 132 determines that the authenticated person 20 is not walking (STEP33), and terminates the processing. The result of this determination is reflected in the determination in STEP23 of FIG. 4. In this case, the mobile device 11 wirelessly transmits the enablement information EI (STEP24). The control device 12 installed in the vehicle 30 accepts the enablement information EI via the receiver 33. Accordingly, the operation of the controlled device 31 can be enabled by the control device 12 (YES in STEP13 and STEP14 of FIG. 3).

When the above condition as for the change in the acceleration is satisfied again (YES in STEP35 in FIG. 5), the processor 132 defines an end point of the time period for performing the walking determination processing (STEP37). In the example illustrated in FIG. 6, the above condition as for the acceleration change is satisfied again at a time point t2 after the time point t1. Accordingly, the processor 132 defines an end point EP of the time period TP at the time point t2. The end point EP is an example of the second time point.

Based on the temporal change (waveform) of the acceleration included in the time period TP thus defined, it is determined whether the authenticated person 20 is walking (STEP38). Specifically, the determination is made based on a plurality of feature quantities illustrated in FIG. 7. The value of each feature quantity and the determination result as to whether the authenticated person 20 is walking are associated with each other based on machine learning, statistical processing, or the like performed in advance. For example, the processor 132 determines whether the authenticated person 20 is walking based on whether each value of the feature quantities to be referred to falls within a prescribed threshold range. Examples of the feature quantities are as follows. It should be noted that all the feature quantities need not to be referred to, but at least one of the feature quantities may be referred to.

Figure 7:
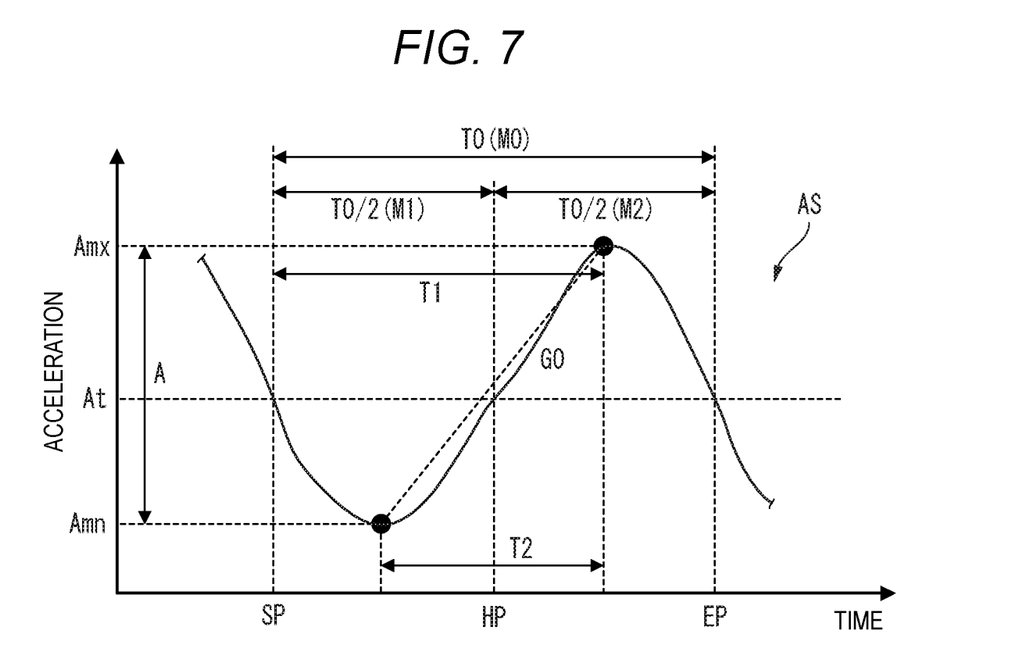
FIG. 7 illustrates details of the walking determination processing.

T0: a length of the time period TP (a time length from the start point SP to the end point EP)

T1: a time length from the starting point SP to a time point when the acceleration takes a maximum value Amx T2: a time length from a time point when the acceleration takes a minimum value Amn to the time point when the acceleration takes the maximum value Amx A: a difference between the maximum value Amx and the minimum value Amn G0: an amount of change in acceleration per unit time from the time point when the acceleration takes the minimum value Amn to the time point when the acceleration takes the maximum value Amx M0: a mean value of the acceleration in the time period TP M1: a mean value of the acceleration in a period from the start point SP to a time point HP that corresponds half the time period TP M2: a mean value of the acceleration in a period from the time point HP to the end point EP When it is determined that a waveform portion of the acceleration signal AS included in the time period TP between the time point t1 and the time point t2 does not satisfy the condition as for walking (NO in STEP38), the processor 132 determines that the authenticated person 20 is not walking (STEP33), and then terminates the processing. The result is reflected in the processing of STEP23 in FIG. 4. That is, after the time point t2, the mobile device 11 wirelessly transmits the enablement information EI (STEP24). The control device 12 installed in the vehicle 30 accepts the enablement information EI via the receiver 33. Accordingly, the operation of the controlled device 31 can be enabled by the control device 12 (YES in STEP13 and STEP14 of FIG. 3).

When it is determined that the waveform portion of the acceleration signal AS included in the time period TP between the time point t1 and the time point t2 satisfies the condition as for walking (YES in STEP38), the processor 132 determines that the authenticated person 20 is walking (STEP39), and terminates the processing. The result is reflected in the processing of STEP23 in FIG. 4. That is, after the time point t2, the mobile device 11 wirelessly transmits the disablement information DI (STEP25). The control device 12 installed in the vehicle 30 accepts the disablement information DI via the receiver 33. Accordingly, the operation control of the controlled device 31 by the control device 12 is disabled (NO in STEP13 and STEP15 of FIG. 3).

When the processing in FIG. 4 returns to STEP22, the processor 132 initiates the walking determination processing again (STEP40). As described above, the processor 132 determines whether the time period TP is defined (STEP30). In the example illustrated in FIG. 6, since the time period TP is defined between the time point t1 and the time point t2 (YES in STEP30), the processor 132 advances the processing to STEP35, and initiates the processing for defining an end point EP of a next time period TP.

That is, the end point EP of a certain time period TP is treated as the start point SP of the next time period TP. In the example illustrated in FIG. 6, the end point EP defined at the time point t2 is defined as the start point SP of the next time period TP, and the above-described condition as for the acceleration change is satisfied again at a time point t3 after the time point t2. Accordingly, the end point EP of the next time period TP is defined at the time point t3. Namely, the time point t2 is an example of the first time point, and the time point t3 is an example of the second time point.

Except in a case where the end point EP is not determined after the prescribed time period has elapsed (YES in STEP36), the definition of a new time period TP and the walking determination based on the waveform portion of the acceleration signal AS included in the defined time period are repeated (STEP35, STEP37, and STEP38).

When it is determined that the waveform portion of the acceleration signal AS included in the time period TP between the time point t2 and the time point t3 does not satisfy the condition as for walking (NO in STEP38), the processor 132 determines that the authenticated person 20 is not walking (STEP33), and terminates the processing. The result is reflected in the processing of STEP23 in FIG. 4. That is, after the time point t3, the mobile device 11 wirelessly transmits the enablement information EI (STEP24). Accordingly, the operation of the controlled device 31 can be enabled by the control device 12 (YES in STEP13 and STEP14 of FIG. 3).

When it is determined that the waveform portion of the acceleration signal AS included in the time period TP between the time point t2 and the time point t3 satisfies the condition as for walking (YES in STEP38), the processor 132 determines that the authenticated person 20 is walking (STEP39), and terminates the processing. The result is reflected in the processing of STEP23 in FIG. 4. That is, after the time point t3, the mobile device 11 wirelessly transmits the disablement information DI (STEP25). Accordingly, the operation control of the controlled device 31 by the control device 12 is disabled (NO in STEP13 and STEP15 of FIG. 3).

When the processing in FIG. 4 returns to STEP22, the walking determination processing is repeated in the same manner even after the time point t3.

In the present embodiment, as illustrated in FIG. 4, the processor 132 of the processing device 13 installed in the mobile device 11 wirelessly transmits the disablement information DI through the transmitter 112 prior to the execution of the walking determination processing (STEP26). Accordingly, the operation control of the controlled device 31 by the control device 12 is disabled (NO in STEP13 and STEP15 of FIG. 3). In the example illustrated in FIG. 6, after the output of the acceleration signal AS is initiated at the time point t0, the control of the operation of the controlled device 31 by the control device 12 is disabled until the result of the initial walking determination processing is obtained at the time point t2.

That is, the control of the operation of the controlled device 31 by the control device 12 based on the authentication processing is forcibly disabled from the time when the walking determination processing is initiated by the processing device 13 until the time when the determination as to whether the authenticated person 20 is walking is initially made. As a result, it is possible to further reduce the possibility that the operation control of the controlled device 31 is made by an illegal act such as a relay attack that could be performed until the initial walking determination processing is completed. Accordingly, it is possible to improve the convenience of the authentication system 10.

The processor 132 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having recorded a computer program. The general-purpose microprocessor designates at least a part of a computer program stored in the ROM, loads the program on the RAM, and executes the processing described above in cooperation with the RAM. The above-described computer program may be pre-installed in the general-purpose memory, or may be downloaded from an external server device 50 via a wireless communication network 40 illustrated in FIG. 1 and then installed in the general-purpose memory. In this case, the external server device 50 is an example of a non-transitory computer-readable medium having stored a computer program.

The processor 132 having various functions described above may be implemented by a dedicated integrated circuit capable of executing the above-described computer program, such as a microcontroller an ASIC, and an FPGA. In this case, the above-described computer program is pre-installed in a memory element included in the dedicated integrated circuit. The memory element is an example of a non-transitory computer-readable medium having stored a computer program. The processor 132 may also be implemented by a combination of the general-purpose microprocessor and the dedicated integrated circuit.

The above embodiments are merely illustrative for facilitating understanding of the gist of the presently disclosed subject matter. The configuration according to the above embodiment can be appropriately modified or improved without departing from the gist of the presently disclosed subject matter.

In the above embodiment, the processing device 13 is installed in the mobile device 11. According to such a configuration, it is easy to suppress a communication delay that may occur when a result of the walking determination processing is provided to the control device 12 through wireless communication.

However, the processing device 13 may be installed in the external server device 50 illustrated in FIG. 1. In this case, the acceleration signal AS outputted from the acceleration sensor 113 of the mobile device 11 is transmitted from the transmitter 112 to the external server device 50 via the wireless communication network 40. The processing device 13 installed in the external server device 50 executes the walking determination processing described above based on the received acceleration signal AS. The external server device 50 transmits the enablement information EI or the disablement information DI obtained as a result of the walking determination processing to the receiver 33 of the vehicle 30 via the wireless communication network 40. The control device 12 determines whether the operation of the controlled device 31 is enabled based on the received enablement information EI or the received disablement information DI. The result of the walking determination processing may be returned from the external server device 50 to the receiver 111 of the mobile device 11 via the wireless communication network 40.

At least a part of the authentication processing can be performed in the external server device 50. That is, at least one of the function of the processor 132 of the processing device 13 for providing the authentication information AI, the function of the storage device 14 for storing the authentication information AI, and the function of the processor 121 of the control device 12 for collating the authentication information AI provided from the processor 132 with the authentication information AI stored in the storage device 14 can be shared by the external server device 50.

For example, the mobile device 11 having received the trigger signal TS may request the external server device 50 to provide the authentication information AI via the wireless communication network 40. When receiving the request, the external server device 50 transmits the authentication information AI to the receiver 33 of the vehicle 30 via the wireless communication network 40. The control device 12 determines whether the authentication is approved based on the received authentication information AI. The authentication information AI may be returned from the external server device 50 to the receiver 111 of the mobile device 11 via the wireless communication network 40.

Alternatively, the mobile device 11 having received the trigger signal TS transmits the authentication information AI from the transmitter 112 to the external server device 50 via the wireless communication network 40. The external server device 50 storing the authentication information AI in place of the storage device 14 collates the received authentication information AI, and determines whether the authentication is approved. The external server device 50 transmits the result of the authentication processing to the receiver 33 of the vehicle 30 via the wireless communication network 40. The control device 12 determines whether the operation control of the controlled device 31 is enabled based on the result of the received result of the authentication processing.

The control device 12 may be installed in a mobile entity other than the vehicle 30. Examples of the mobile entity include railways, aircrafts, and ships. The mobile entity may not require a driver.

The controlled device 31 whose operation is controlled by the control device 12 in cooperation with the mobile device 11 need not be installed in a mobile entity such as the vehicle 30. The control device 12 may be a device for controlling the operation of a locking device, an air conditioner, a lighting device, an audio-visual equipment, and the like in a house or a facility.

The present application is based on Japanese Patent Application No. 2020-051248 filed on Mar. 23, 2020, the entire contents of which are incorporated herein by reference.

What is claimed is:

1. An authentication system, comprising:
  a mobile device adapted to be carried by a person to be authenticated;
  an acceleration sensor installed in the mobile device and configured to output an acceleration signal corresponding to an acceleration applied to the mobile device;
  a processing device configured to execute determination processing for determining whether the person is walking based on the acceleration signal; and
  a control device configured to control an operation of a controlled device based on a result of the determination processing and a result of authentication processing for authenticating, by way of the mobile device, the person as a user of the controlled device,
  wherein the control of the controlled device based on the authentication processing is forcibly disabled until an initial determination as to whether the person is walking or not is completed.

2. The authentication system according to claim 1, wherein the processing device is installed in the mobile device.

3. A mobile device adapted to be carried by a person to be authenticated, comprising:
  an acceleration sensor configured to output an acceleration signal corresponding to an acceleration applied to the mobile device; and
  a processor configured to forcibly disable a control device that controls and operation of a controlled device based on authentication processing for authenticating the person as a user of the controlled device until determination processing for determining whether the person is walking based on the acceleration signal is initially completed.

4. The mobile device according to claim 3, wherein the processor is configured to execute the determination processing based on the acceleration signal.

5. A processing device, comprising:
  a reception interfaced configured to accept an acceleration signal corresponding to an acceleration applied to a mobile device adapted to be carried by a person to be authenticated from an acceleration sensor installed in the mobile device; and
  a processor configured to forcibly disable a control device that controls an operation of a controlled device based on authentication processing for authenticating, by way of the mobile device, the person as a user of the controlled device until determination processing for determining whether the person is walking based on the acceleration signal is initially completed.

6. A non-transitory computer-readable medium having stored a computer program adapted to be executed by a processor of a processing device and configured to, when executed, cause the processing device to:
  accept an acceleration signal corresponding to an acceleration applied to a mobile device adapted to be carried by a person to be authenticated from an acceleration sensor installed in the mobile device;

execute determination processing for determining whether the person is walking based on the acceleration signal; and disable forcibly a control device that controls an operation of a controlled device based on authentication processing for authenticating, by way of the mobile device, the person as a user of the controlled device until the determination processing is initially completed.

\* \* \* \* \*

UNITED STATES PATENT AND TRADEMARK OFFICE
CERTIFICATE OF CORRECTION

| | |
|---|---|
| PATENT NO. | : 11,447,098 B2 |
| APPLICATION NO. | : 17/208394 |
| DATED | : September 20, 2022 |
| INVENTOR(S) | : Y. Nawa et al. |

It is certified that error appears in the above-identified patent and that said Letters Patent is hereby corrected as shown below:

In the Claims

Column 12, Line 38 (Claim 3, Line 7) please change "controls and" to -- controls an --

Signed and Sealed this
Twenty-first Day of March, 2023

*Katherine Kelly Vidal*

Katherine Kelly Vidal
*Director of the United States Patent and Trademark Office*